Jan. 12, 1932.    G. MACKINTOSH    1,840,729
INDICATOR FOR OFFICES AND THE LIKE
Filed Feb. 9, 1931
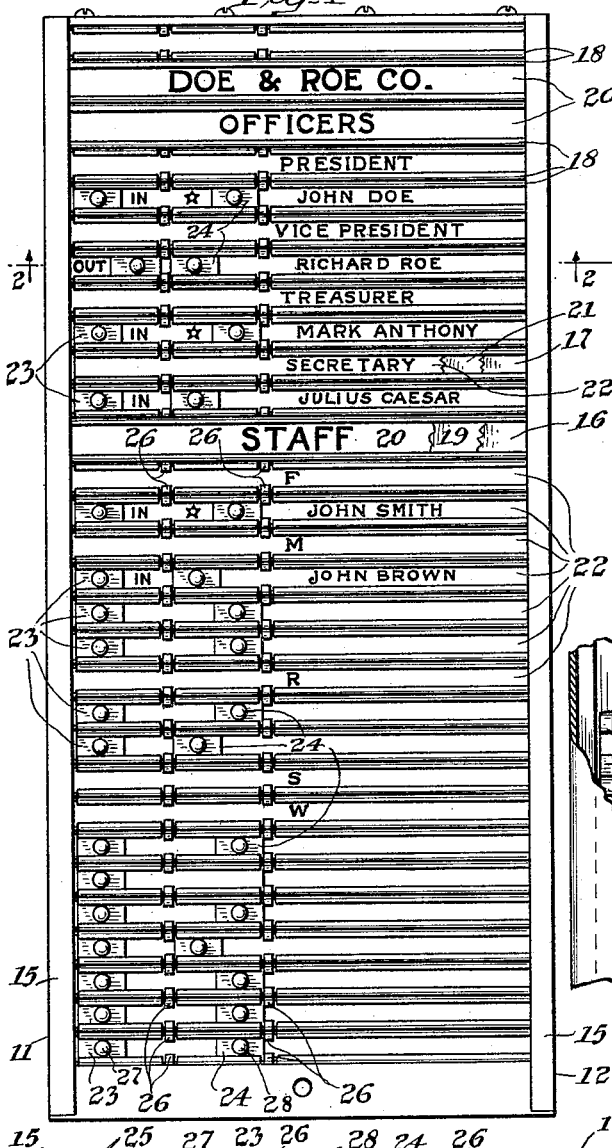
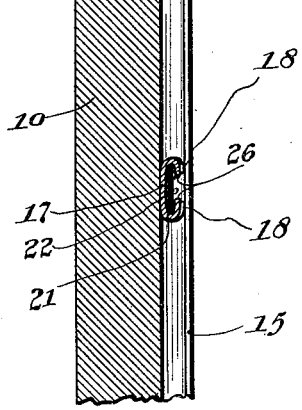
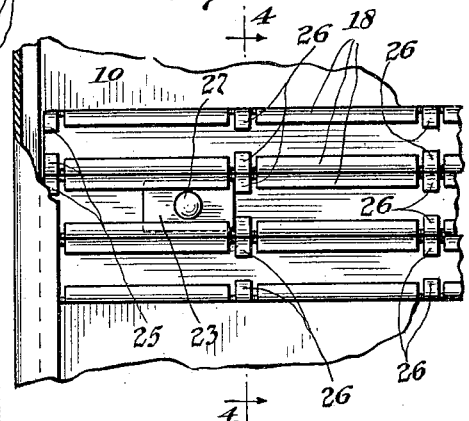
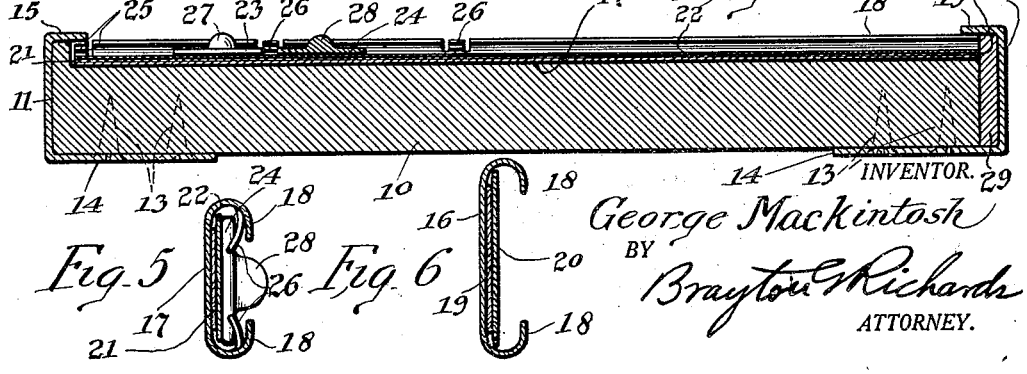
INVENTOR.
George Mackintosh
BY
Brayton G Richards
ATTORNEY.

Patented Jan. 12, 1932

1,840,729

UNITED STATES PATENT OFFICE

GEORGE MACKINTOSH, OF BROOKLYN, NEW YORK, ASSIGNOR TO THE TABLET AND TICKET COMPANY, OF CHICAGO, ILLINOIS, A CORPORATION OF ILLINOIS

INDICATOR FOR OFFICES AND THE LIKE

Application filed February 9, 1931. Serial No. 514,364.

The invention relates to improvements in indicators for offices and the like, and has for its primary object the provision of a simple and efficient construction of the character indicated which is capable of economical manufacture.

Another object of the invention is the provision of improved means for forming the separate lines of an office indicator or the like, whereby changes may be readily made in the same.

Another object of the invention is the provision of an improved arrangement for office indicators or the like, whereby different facts and circumstances may be readily recorded and presented.

Another object of the invention is the provision of an improved body for forming the different lines of an office indicator or the like, so constructed and arranged as to permit of ready changes therein and affording proper protection to the changeable matter thereof.

Other objects will appear hereinafter.

The invention consists in the combinations and arrangements of parts hereinafter described and claimed.

The invention will be best understood by reference to the accompanying drawings forming a part of this specification, and in which, Fig. 1 is a face view of an office indicator embodying the invention;

Fig. 2 an enlarged horizontal section of the same taken substantially on line 2—2 of Fig. 1;

Fig. 3 an enlarged partial face view of a portion of the indicator shown in Fig. 1 but shown with portions broken away and other portions removed for the sake of clearness;

Fig. 4 an enlarged partial vertical section taken substantially on line 4—4 of Fig. 3;

Fig. 5 a still further enlarged transverse section of one of a plurality of removable bodies employed in the indicator; and Fig. 6 a similar view of another of said removable bodies employed in the indicator.

The embodiment of the invention illustrated in the drawings comprises a suitable body board 10, which may be made of wood and is covered at each vertical edge by metallic channel members 11 and 12, each of said channel members being secured in place by means of screws 13 taking through the long leg 14 thereof and into the back of the board 10. Each channel member is also provided with a shorter leg 15 resting over the front edge of the board 10, as best shown in Fig. 2.

The front face of the board 10 is recessed as shown to provide space for the reception of two removable bodies 16 and 17, with the ends thereof projecting into the recesses formed by the overhanging portions of the short legs 15 of the channel members 11 and 12 as shown. Each of the members 16 and 17 is made of metal, preferably stainless steel, and in the form of a channel having inwardly turned sides 18, the body 16 being somewhat wider than the body 17, as best shown in Figs. 5 and 6.

Arranged within each of the body members 16 is an indicator strip 19 of paper, upon which are placed suitable letters, as shown, for general designations, said indicator strip 19 being covered by a transparent strip 20 of celluloid, and both of said strips being slipped into and removable from the ends of the body 16 when said body is removed from the indicator board, as will be readily understood.

Each of the body members 17 is also made of metal, preferably stainless steel, and is also made in channel form with inwardly turned sides 18, the only difference in this respect over the body members 17 being in the width of the bodies. Likewise each of the body members 17 carries a removable indicator paper strip 21 and a removable transparent covering strip 22.

Each of the indicator strips 21 is provided with lettering such, for instance, as the names of the various officers or individuals of an office organization, as indicated in the drawings.

Arranged in the body members 17 are two slidable concealing tabs 23 and 24, the edges of said tabs slidably engaging under the inwardly turned sides 18 of the bodies 17. Stop members 25 and 26 are provided in the sides 18 to limit the sliding movements of the tabs 23 and 24. The stop members 25 are formed from the sides 18 by providing slits or cuts adjacent and parallel to the corresponding end of the body 17, whereby a lug or ear is freed from the corresponding side and is bent inwardly, as indicated in Fig. 5, to constitute a stop for the tab 23. Likewise the stops 26 are formed by means of parallel adjacent slits or cuts and are likewise bent inwardly to constitute stops, as will be readily understood. It will be noted from an examination of Fig. 5 that the cuts or slits forming the said stops do not extend all the way to the bottoms of the sides of the channel bodies 17 so as to leave substantial flanges of material at the sides to stiffen the bottoms or backs of said channels against bending in use.

As shown, the tabs 23 and 24 are provided with central outwardly extending bosses or projections 27 and 28 for engagement by the fingers in adjusting said tabs in the members 17. As shown, the indicator strips 21 are provided with the words "Out" and "In" arranged adjacent each other under the paths of the concealing tabs 23 and also with stars or other indications under the paths of the concealing tabs 24. By this arrangement it will be noted that the presence or absence of the various members of an office organization may be readily indicated on the indicator board by shifting the tabs 23 to expose or conceal the words "Out" or "In". Likewise the tabs 24 may be readily shifted to expose or conceal the stars or other indication, it being intended that said stars may be utilized for indicating the arrival of a telegram, special caller, or something of the kind for the individual officers of the organization.

As shown in Fig. 2, the channel member 12 is arranged to project slightly from the corresponding edge of the board 10, thereby forming a recess for the reception of a removable locking bar or slide 29, said locking bar thus reducing the depth of the corresponding recess under the corresponding flange 15. As indicated in Fig. 2, when the locking bar 29 is in place, the different line bodies 16 and 17 will be locked in position, with their ends under the edges of the flanges 15, but when the locking bar 29 is removed, any or all of said line bodies 16 and 17 may be moved longitudinally into the space vacated by the outer portion of the bar 29, thereby freeing the other end from the other flange 15, so as to permit of the ready removal of said bodies from the board when desired.

In this manner an indicator is provided which is especially adapted for use as an office indicator to indicate the presence or absence of the officers of a business organization and other information. The arrangement is such that each indicator strip may be readily changed as desired so that the construction thus provided may be readily utilized for a wide diversity of purposes. Obviously a plurality of the indicator boards may be used adjacent each other, under which circumstances the same may be used as a directory or index for office buildings of various sizes. The specific form and arrangement of parts is a simple and efficient one for the purpose.

While I have illustrated and described the preferred form of construction for carrying the invention into effect, this is capable of variation and modification without departing from the spirit of the invention. I, therefore, do not wish to be limited to the precise details set forth, but desire to avail myself of such variations and modifications as fall within the scope of the appended claims.

Having thus fully described my invention, what I claim as new and desire to secure by Letters Patent is:

1. A construction of the class described comprising a support; a rigid body removably mounted on said support and of a size to form a line of an office indicator or the like; an indicator strip removably mounted on said body; and a transparent strip removably mounted on said body over said indicator strip.

2. A construction of the class described comprising a support; a rigid body removably mounted on said support and in the form of a channel having inturned sides and of a size to form a line of an office indicator or the like; an indicator strip removably mounted in said channel; and a transparent strip removably mounted in said channel over said indicator strip.

3. A construction of the class described comprising a support; a rigid metal body removably mounted on said support and of a size to form a line of an office indicator or the like; a paper indicator strip removably mounted on said body; and a transparent strip of celluloid removably mounted on said body over said indicator strip.

4. A construction of the class described comprising a support; a rigid metal body removably mounted on said support and in the form of a channel having inturned sides and of a size to form a line of an office indicator or the like; a paper indicator strip removably mounted in said channel; and a transparent strip of celluloid removably mounted in said channel over said indicator strip.

5. A construction of the class described comprising a support; a rigid body removably mounted on said support and in the form of a channel having inturned sides and of a size to form a line of an office indicator or the like; an indicator strip removably mounted in said channel; a transparent strip removably mounted in said channel over said indicator strip; and one or more concealing tabs slidable in said channel.

6. A construction of the class described comprising a support; a rigid metal body removably mounted on said support and in the form of a channel having inturned sides and of a size to form a line of an office indicator or the like; a paper indicator strip removably mounted in said channel; a transparent strip of celluloid removably mounted in said channel over said indicator strip; and one or more concealing tabs slidable in said channel.

7. A construction of the class described comprising a body in the form of a channel having inturned sides; an indicator strip removably mounted in said channel; and a concealing tab slidable in said channel; and adapted and arranged to conceal and expose portions of said strip.

8. A construction of the class described comprising a body in the form of a channel having inturned sides; a concealing tab slidable in said channel; and stops for said tab formed from the sides of said channel.

9. A construction of the class described comprising a body in the form of a channel having inturned sides; a concealing tab slidable in said channel; and stops for said tab formed from the sides of said channel by cutting parallel slits in the sides and bending down the portions between said slits.

10. A construction of the class described comprising a body in the form of a channel having inturned sides; a concealing tab slidable in said channel; and stops for said tab formed from the sides of said channel by cutting parallel slits in the sides and bending down the portions between said slits, said slits terminating well above the bottoms of the channel sides so as to leave sufficient uncut material to stiffen the bottom of said channel.

In witness whereof, I have hereunto set my hand this 2nd day of February, 1931.

GEORGE MACKINTOSH.